Patented Dec. 30, 1930

1,787,418

UNITED STATES PATENT OFFICE

RICHARD W. LEWIS, OF MONTCLAIR, NEW JERSEY

DISPERSION AND METHOD OF MAKING THE SAME

No Drawing.  Application filed May 27, 1925. Serial No. 33,304.

My invention relates to bituminous dispersions useful in the arts generally and particularly for the protection of materials generally from water and corrosive actions, and as binders, roofing, tunnel lining, wall and floor covering, and other purposes, and to methods of producing and preparing such dispersions. It relates to bitumen dispersions for the protection of materials generally against the effects of water and of various other corrosive agents; these dispersions being useful alone or in various compositions in which they act as a binder. It relates more particularly to a dispersing agent for such dispersions and to bituminous dispersions containing and prepared with such an agent which is of such a nature and has such characteristics that when thoroughly wetted with water (or other dispersion medium) prior to coming in contact with the bitumen such as asphalt it will reside at the interface or partially adhere to the bitumen particles but will not while wet be absorbed by them; but upon drying and coming into intimate contact with the bitumen it will thereafter reject any tendency of water to wet it or displace it from the bitumen, that is, it will have a greater tendency to be wetted by the bitumen than by the water.

I have discovered that a very practical bitumen dispersion can be prepared by using as a dispersion agent a material having the following characteristics:

1. Capability of being "wetted" by either the dispersion medium (such as water) or the material dispersed (asphalt).
2. Preference for the dispersion medium when previously wetted by it, in the presence of both the dispersion medium and the material to be dispersed.
3. Readily dehydrated.
4. Must not be hydroscopic.
5. Insoluble in and inert to ordinary reagents.
6. Preference, for the material dispersed when previously "wetted" thereby and then brought into the presence of the dispersion medium.

A satisfactory statement of the principal ingredients of the bitumen-water dispersions of my invention and of their unique functions and controllable characteristics in the preparation first of a wet or workable aqueous dispersion and secondly of a dried irreversible bitumen dispersion may be made by considering the aqueous dispersions to consist of three phases as follows: first phase—water; second phase—bitumen; third phase—a dispersing agent which has the capability of being wetted by either the first or the second phase but which in the predominating presence of one of them will resist being wetted by the other and which possesses this capability by virtue of a change of physical condition from that in which it is when the aqueous dispersion is made to that in which it is when the major portion of the total water has been removed from the hitherto aqueous dispersion.

When a dispersion of bitumen in water effected in the presence of a third phase which is in the form of a fine grained powder of insoluble and inert material is allowed to dry by evaporation or other removal of water the resulting mass consists of minute particles of bitumen, partly coalesced, and partly coated and separated by the third phase, whose particles form a network around the particles of bitumen.

Even though this third phase consists entirely of insoluble matter, the dried mass is not necessarily or even usually waterproof as made according to the prior art heretofore. If the bitumen is properly chosen there is no failure of or through the bitumen itself. But failure has occurred either in the third phase itself within or between its own particles, or at the junction surfaces between particles of the bitumen and of the third phase. And in cases where both the bitumen and the third phase are insoluble failure often occurs through the ready absorption of water either in, on, or between the particles of the third phase with a consequent softening of its body and the loosening of its bond to the bitumen.

These difficulties I am able to avoid by the use, according to my invention, of a material in a gelatinous state carrying considerable water of hydration but which may contain some particles of an appreciable grittiness so that it will assist in the disintegration of the bitumen during the dispersing operation thereon, which material is inert chemically and insoluble and is capable of being irreversibly changed into a thoroughly dry and non-absorptive state when its water is removed preferably with the water of the first phase; that is, with the dispersing medium. The disintegrating power of the gelatinous hydrate or third phase may, when desired, be fortified by the addition of an inert and insoluble assisting agent, in which case the latter will form part of the third phase.

I have further discovered that for dispersions of asphalt in water, aluminum hydrate most preferably in the gelatinous state is a very efficient, practical and highly desirable dispersing agent because when dispersed with the asphalt in water it is thoroughly wetted by the water and will not be mixed into the bodies of the asphalt particles, but when the dispersion is dried it, the aluminum hydrate, will adhere tenaciously to the asphalt about it and will not thereafter be wetted by water.

This change of characteristics in this respect is most pronounced when aluminum hydrate in the gelatinous state is used for the dispersing agent or part thereof, because of the difference of the physical properties of the hydrate when in the gel and when in the dried condition. It is to be understood that other compounds which are inert and which have a gelatinous condition from which can be prepared the substance in the dry inert condition are suitable for preparing dispersions of asphalt or other bitumen in water as above set forth, such for example as certain forms of silica in the gel and dried gel state, ferric hydrate, etc., but as I have found aluminum hydrate to possess the most desirable features I prefer that material or a mixture of aluminum hydrate in the gel state with some other substance which is inert normally, such for example as ground silica or asbestine.

I have discovered that by the admixture of aluminum hydrate (gelatinous) with one or more substances which may or may not be in themselves good dispersing agents, and by using these mixtures as dispersing agents, aqueous bituminous dispersions may be prepared which, on drying under ordinary atmospheric conditions for periods as short as twenty-four hours, form coats or masses which are extremely resistant to water and to ordinary dilute reagents; and that the dried residuums from dispersions so formed are more tenacious in their bond and more coherent throughout their mass than are the dried residuums from dispersions made without the use of gelatinous aluminum hydrate.

I have further discovered that by mixing gelatinous aluminum hydrate with certain inert insoluble substances and utilizing the mixture as a dispersing agent for bitumens, that the resulting dispersion, when allowed to dry by the evaporation or other removal of the dispersing medium, forms a mass having peculiarly valuable properties.

The dried mass consists essentially of minute particles of bitumen, mutually bonded together by a partial coalescence, yet enclosed in a firmly attached network or skeleton of the non-bituminous material or materials of the dispersion. This skeleton serves to retain in place soft and adhesive bitumens even at temperatures far above their melting point. This structure utilizes the adhesive qualities of the dispersed substance while counteracting its undesirable softness and tendency to flow.

Specific combinations, when used as dispersing agents for bitumens and subsequently retained in various proportions in the completed dispersions, which have been found to give unique and valuable properties as regards bond, structure, resistance to heat, to water and to various reagents are:

1. Gelatinous aluminum hydrate and finely ground silica.
2. Gelatinous aluminum hydrate and finely ground asbestine (comprising such minerals as agalite dolomite, etc. and/or other substances or mixtures which, when ground, pass under the trade designation of "asbestine").
3. Gelatinous aluminum hydrate and the ground natural or artificial oxides of iron.
4. Gelatinous aluminum hydrate and any or all of the ground pigments, chrome yellow, chrome green, Prussian blue.
5. Gelatinous aluminum hydrate and any of the inert insoluble materials commonly known as pigments or dry colors.

The proportions of the three ingredients or phases of the water-bitumen dispersions range substantially as follows: bitumen or asphalt—one to thirty-one parts to one part of non-aqueous phase by weight, with total water (inclusive of water of hydration and gelatinization of the third phase in its original state) in amounts from one-half to one and one-half times the weight of the bitumen. These proportions have been found by actual test and use to be useful and practical for different uses requiring different degrees of resistance to abrasion, recurrent expansion and contraction, and to various and varying conditions of temperature during the drying of the dispersion and thereafter.

In the aqueous dispersions of bitumens or waxes of the prior art intended for use after drying and where exposed to the action of water or reagents, the presence of the substance or substances used as the dispersing and/or grinding agent has been a source of weakness in that it has been found to be chemically or physically affected by water and other common agents to such an extent that the dried mass rapidly loses part or all of its cohesive, bonding and adhesive properties.

In practice to produce these dispersions, as an example, one part of gelatinous aluminum hydrate containing about eighty per cent. of water, or one part of a mixture of equal parts by weight of such gelatinous aluminum hydrate and of asbestine or of silica, etc., is placed in a mechanical agitator such as of the paint mill type well known in the art together with a sufficient quantity of water to make a paste of the mixture. Agitation is then started, and from one to twenty or more parts of bitumen in a fluid state are added, whereupon the bitumen is shredded and disintegrated by the combined action of the stirrer and of the dispersing agent. The dispersion having been thoroughly mixed and brought to any desired consistency by the addition of water it is drawn off and barrelled or otherwise put up for transportation. When desired after a dispersion of the desired proportions of dispersion agent, dispersion medium, and bitumen has been prepared the mixing is continued while a quantity is drawn off from time to time or continuously with an accompanied addition of the constituents in the right proportions whereby is secured a continuous process of the making of the dispersion.

The above mix is given as one example of my new dispersion and the method of making it, but, as the materials are dispersible in many proportions, it is to be understood that the proportions may be varied to meet the conditions under which the dispersions are to be used, or any of the other combinations mentioned may be prepared in various proportions.

These dispersions are allowed to stand in the shipping packages and will be found to remain stable indefinitely in a liquid or pasty condition so long as sufficient water is present, and evaporation of the water in the dispersion is prevented. It is within the skill of the operator to regulate the consistency of the dispersion for the service for which it is to be put, either by withdrawing some of the water from the receptacle if any has separated out, or by adding water thereto before applying it.

The dispersions described herein have the property of drying quickly and permanently and are resistant after drying to the disintegrating action of water or other agents and possess properties not present in the dispersions of the prior art.

Other previously known dispersions, such as those of asphalt and clay in water, when dried for such period as would be practicable before exposure, I have discovered suffer when in use from the disadvantage that the clay is readily attacked, softened, and disintegrated by the action of water and of dilute acids, bases, and salt solutions. That is, the ordinary clay bitumen dispersions heretofore known do not in the ordinary course of events and in the time which they usually are given for drying acquire a degree of dryness and stability such as will withstand such exposures to water and aqueous solutions as they will normally be subjected to, but will disintegrate on comparatively short exposures. This tendency towards disintegration of the dried material under aqueous action subsequent to drying can be counteracted only by very prolonged drying, say for several weeks, before exposure, which drying affords opportunity for partial absorption of the vulnerable agent within the particles of bitumen and for the bitumen to tend toward becoming one continuous mass interspersed by the skeleton of dispersing agent particles. But with dispersing agents as heretofore known and used the drying period is thoroughly impractical and entails prohibitive expense with the ultimate result that a cheap, efficient, long lived and practical material of this kind has not been obtainable. But with the material of my invention the drying time is cut down to practical limits for securing bitumen dispersion products having a length of life under exposure to water heretofore unheard of. For example, where it might require one hundred days to dry a clay bitumen dispersion so that it would withstand one hundred days of immersion in water, bitumen dispersions are obtainable with the material or mixtures of my invention which will withstand one hundred days' exposure to water after only one or two days of drying. The particular combinations which constitute my present invention are usually more than twice as effective as any constituent used alone, in providing a structure in the dried mass which is firmly coherent and adhesive and resistant to the chemical and physical action of water and of other liquids commonly encountered. In particular, the mixture of aluminum hydrate and the assisting agent in such mixtures acts during the dispersion as an effective dispersing agent and also the mixture serves in the preservation of the dispersion, and on drying acts as an efficient and resistant cementing material. The gelatinous aluminum hydrate also has these combined properties when used alone or with another inert substance, and can even be used with clay in bitumen dispersions and will be found to have improved the dispersion and conferred on such dispersion valuable resistant properties. This is true as well for soap or other commonly known emulsions and dispersions.

Below is an outline table of examples of uses and proportions of constituents therefor of the dispersions of my invention:

| Parts by weight | | Example of use |
|---|---|---|
| Bitumen | Dried agent | |
| 1/10 to 1 | 1 | Plaster and plastic compositions, lutes, cements, etc. |
| 1 to 4 | 1 | Trowelled applications as plaster, floors, walls, etc. |
| 4 to 10 | 1 | Highly adhesive coatings for protection against water and corrosion. |
| 10 to 40 | 1 | Very highly adhesive and resistant coatings and binders. |

*Note.*—In preparing dispersions for use water is added to adjust the consistency desired for trowel, brush or spray application.

In the above mixture the resistance to flow under heat is diminished and the adhesion and resistance to water are increased with increasing proportion of bitumen to agent.

For purposes of designating in the claims the relative amounts of bitumen and dispersing agent in the dispersions I refer, in some cases, to the amounts of ash to which the dispersing agent is reducible and it is to be understood that in considering the scope of these claims that the ash of the dispersing agent is a valid measure of that agent present in any given mix.

While I have cited stable mixtures or dispersions of given proportions of constituents it may be desired to use mixtures in which the dispersing agent is present in a minimum amount and the bitumen is present in as high as sixty to eighty parts to one of the dispersing agent. These dispersions of higher bitumen content are characterized by a high degree of adhesion and flexibility and are useful in the arts generally for purposes of requiring these characteristics in bitumen dispersions.

What I claim is:

1. A dispersion consisting of a dispersing medium, a dispersed substance comprising bitumen, and a dispersing agent containing hydrated metallic oxide, said dispersing medium and said dispersed substance being immiscible in each other, said agent and dispersed substance being of such a nature as to form an adhesive coherent mass in the absence or on removal of the dispersing medium, said dispersing agent being capable of dehydration, non-hydroscopic, insoluble, inert and of such nature as to be capable of being wetted by either of the other elements but resistant to being displaced by one of them when previously wetted by the other, and of such a nature that when completely wetted by the dispersing medium it will aid in the dispersion of the substance to be dispersed therein, and of such a nature as to resist after the removal of the dispersing medium by drying or otherwise being subsequently displaced by exposure to the dispersing medium.

2. A dispersion consisting of a dispersing medium, a dispersed substance and a dispersing agent which occurs or is preparable in a state where prior to its contact with a substance to be dispersed it can be wetted by the dispersing medium but which after drying out or other removal of the dispersing medium will be wetted by and will cling to the particles of dispersed substance in such manner as effectively to resist over a considerable period of time its displacement therefrom by subsequent exposure to the dispersing medium, said dispersing agent consisting of a mixture comprising a substantial portion of gelatinous hydrated metallic oxide and other inert materials.

3. A dispersion of bitumen capable of forming when dried an irreversible film comprising, an aqueous dispersing medium, a dispersed bitumen and a dispersing agent comprising uncombined gelatinous hydrated metallic oxide which occurs or its preparable in a state where prior to its contact with the bitumen it can be wetted by the aqueous dispersing medium but which after drying out or other removal of the dispersing medium will be wetted by and will cling to the particles of previously dispersed bitumen in such manner as effectively to resist over a considerable period of time its displacement therefrom by subsequent exposure to the aqueous dispersing medium.

4. A dispersion of bitumen, comprising, an aqueous dispersing medium, a dispersed bitumen and a dispersing agent which occurs or is preparable in a state in which it has a tendency to be wetted by the aqueous dispersing medium but which when the dispersion is dry has a tendency to resist being displaced by re-exposure to the material of the aqueous dispersing medium, said dispersing agent consisting of gelatinous aluminum hydrate.

5. A dispersion of a bitumen in water comprising a bitumen, water, and a dispersing agent consisting of gelatinous hydrated metallic oxide which occurs or is preparable in a state in which it has a tendency to be wetted by water but which when the dispersion is dried changes its characteristics and becomes resistant to being displaced by water but adheres to the bitumen.

6. A dispersion of bitumen in water comprising a bitumen, water, and a dispersing agent consisting of a mixture of insoluble and inert material and a gelatinous hydrated oxide which occurs or is preparable in a condition in which it has a tendency to be wetted by water but which when the dispersion is dried changes its characteristics and becomes resistant to being displaced by water but adheres to the bitumen.

7. A dispersing agent consisting of aluminum hydrate paste and asbestine.

8. In a dispersion of bitumen in water, a dispersing agent consisting of substantially equal parts of asbestine and of aluminum hydrate paste containing water about 80%.

9. A dispersion of bitumen in water, comprising bitumen about 80%, aluminum hydrate paste about 10%, asbestine about 10%, and sufficient water to maintain the dispersion.

10. The method of dispersing bitumen in water, comprising the step of disintegrating the bitumen with the aid of gelatinous aluminum hydrate paste and asbestine while mixing it with the water.

11. An aqueous bitumen dispersion having an inert, insoluble dispersing agent comprising gelatinous hydrated metallic oxide in which the bitumen is present in greater amounts than the dispersing agent, said dispersion when once dry being thereafter unaffected by water.

12. An aqueous dispersion of bitumen and a dispersing agent comprising gelatinous hydrated metallic oxide and in which the weight of the bitumen is from one to fifty times the weight of the dispersing agent calculated as ash, said dispersion when once dry thereafter being unaffected by water.

13. An aqueous dispersion of bitumen and dispersing agent comprising gelatinous hydrated metallic oxide in which the bitumen is present in an amount greater than the amount of the ash of said dispersing agent, said dispersion when once dry being thereafter unaffected by water.

14. A dispersing agent consisting of a mixture of an insoluble and inert material and of gelatinous hydrated oxide which occurs or is preparable in a condition in which it has a tendency to be wetted by water.

15. A dispersion of bitumen in water comprising a bitumen, water and a dispersing agent consisting of a mixture of gelatinous aluminum hydrate and an element of the group comprising asbestine, silica, oxides of iron, chrome yellow, chrome green and Prussian blue.

16. A dispersion of bitumen in water comprising a bitumen, water and a dispersing agent consisting of a mixture of hydrated oxide and an element of the group comprising asbestine, silica, oxides of iron, chrome yellow, chrome green and Prussian blue.

17. A dispersing agent comprising an uncombined hydrated inorganic metallic oxide which occurs or is preparable in a gelatinous state and which is capable of being wetted by water and of forming a dispersion of bitumen in water which, when dried, is irreversible when exposed to water.

18. A dispersing agent comprising aluminum hydrate which occurs or is preparable in a gelatinous state and which is capable of being wetted by water and of forming a dispersion of bitumen in water which, when dried, is irreversible when exposed to water.

In testimony whereof I hereto affix my signature.

RICHARD W. LEWIS.